No. 862,698. PATENTED AUG. 6, 1907.
J. H. BIERBAUM.
TREE PROTECTOR.
APPLICATION FILED MAR. 13, 1906.
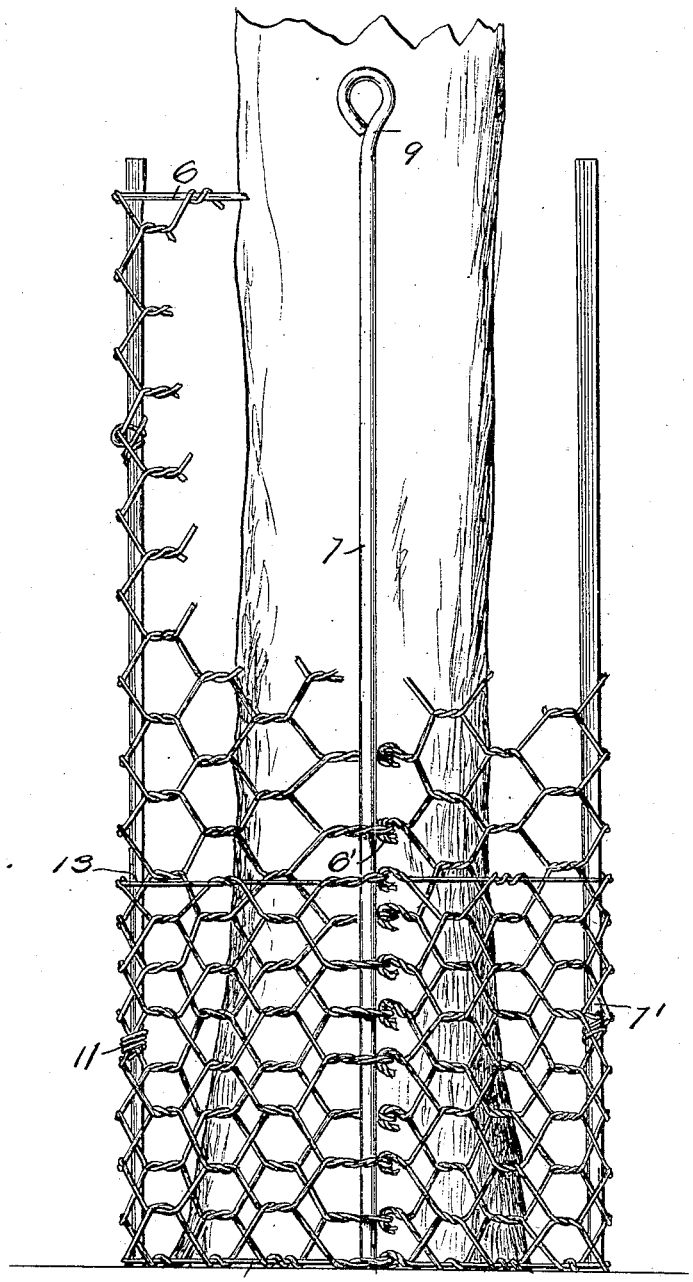
WITNESSES:
INVENTOR
John H Bierbaum
By
Attorneys

UNITED STATES PATENT OFFICE.

JOHN H. BIERBAUM, OF MARTHASVILLE, MISSOURI.

TREE-PROTECTOR.

No. 862,698.  Specification of Letters Patent.  Patented Aug. 6, 1907.

Application filed March 13, 1906. Serial No. 305,879.

*To all whom it may concern:*

Be it known that I, JOHN H. BIERBAUM, a citizen of the United States, residing at Marthasville, in the county of Warren, State of Missouri, have invented certain new and useful Improvements in Tree-Protectors; and I do hereby declare the following to be a full, clear, and exact description of the invention, such as will enable others skilled in the art to which it appertains to make and use the same.

The present invention relates to guards for protecting young fruit trees from rabbits and other animals that are liable, where they exist in large numbers during the winter time especially, to gnaw off and eat the tender bark and thus seriously injure or actually kill the trees.

The mischief has become so serious and costly as to call for entirely efficacious means to prevent rodents from destroying young trees in large numbers. Rabbits, particularly in some sections have become so numerous that in their efforts to secure sustenance through the winter months, they resort to such means that in a single night they will frequently destroy an orchard of the finest fruit trees, if the trunks are not in some way protected against their ravages.

It is the object of the present invention, therefore, to provide a tree protector formed of woven wire, that will be perfectly efficient for the uses for which it is intended, and that can be produced at low cost, and, moreover, can be set up and kept in order by persons of common mechanical skill.

The invention will be readily understood from the following detailed description, and its preferred embodiment is illustrated in the accompanying drawings, in which the figure shows a front elevation, partly broken away, of a tree protector constructed in accordance with the present invention.

In the formation of the guard, a sheet of woven wire of the proper size is cut out by wire shears, and in its upper edge is engaged a strengthening wire 6. The lower edge of the wire sheet is, in like manner, engaged in a second strengthening wire 12. Along the raw vertical edges of the sheet the individual wires on each side, not already twisted together in the formation of the web, are twisted and formed into hooks and eyes 6', which are then connected. In connection with the cylindrical guard so formed there is used a stout rod 7 of metal longer than the height of the guard, so that a good length 8 below the protector may be forced into the ground to keep the latter in vertical position, and, if desired, a loop 9 may be left at the top of the rod to aid in its manipulation. The hook-and-eye parts, above referred to, are joined across the rod in such a way that the alternate strands fit on opposite sides of the rod, so that, in a sense, they interlace therewith.

Where poles or stakes of wood can readily be procured, it is not proposed to use more than one vertical rod 7 of metal, in the interest of economy. Other stakes 7' of wood, higher than the tree protector, may be used and driven into the ground around the tree and bound to the tree protector by individual strands of wire 11.

I propose to double the thickness of the protector at its lower part for about as high as a rabbit could work mischief and leave a part thereabove of a single thickness, as shown, it being understood that a rodent cannot work mischief as high as he can reach by rearing on his hind legs, if the least resistance is offered thereto. To this end I employ a second strip of wire fabric, which is connected at its lower end to the lower strengthening wire 12 at its upper end to a similar wire 13, the meeting ends of the strands of said sheet being in like manner, formed into hooks and eyes, which are connected and extend across the rod 7 in a manner similar to that described in connection with the main sheet. With reference to this outer or strengthening section of the guard, it will be noted that its meshes cross those of the main section or sheet of wire, thus rendering it impossible for the rodent to reach a tree so protected.

What is claimed, is—

A tree guard consisting of a sheet of woven wire fabric bent into cylindrical form and having the meeting ends of its strands twisted together, upper and lower strengthening wires secured to the edges of said sheet, a second sheet of wire secured to the lower strengthening wire exteriorly of said first-mentioned sheet, to form a double thickness at the lower end of said guard, said second sheet having its meshes crossing those of said first-mentioned sheet, a strengthening wire secured to the upper edge of said second sheet, and a metallic rod disposed at the meeting ends of said wire sheets, the strands of both of said sheets being interlaced with said rod.

In testimony whereof, I affix my signature, in presence of two witnesses.

JOHN H. BIERBAUM.

Witnesses:
OTTO BERG,
A. C. HASENJAEGER.